United States Patent
Murakami et al.

(10) Patent No.: US 11,239,003 B2
(45) Date of Patent: Feb. 1, 2022

(54) SUPPORT SUBSTRATE FOR RADIOISOTOPE PRODUCTION, TARGET PLATE FOR RADIOISOTOPE PRODUCTION, AND PRODUCTION METHOD FOR SUPPORT SUBSTRATE

(71) Applicant: Kaneka Corporation, Osaka (JP)

(72) Inventors: Mutsuaki Murakami, Osaka (JP); Atsushi Tatami, Osaka (JP); Masamitsu Tachibana, Osaka (JP)

(73) Assignee: KANEKA CORPORATION, Osaka (JP)

( * ) Notice: Subject to any disclaimer, the term of this patent is extended or adjusted under 35 U.S.C. 154(b) by 402 days.

(21) Appl. No.: 16/077,377

(22) PCT Filed: Apr. 20, 2017

(86) PCT No.: PCT/JP2017/015932
§ 371 (c)(1),
(2) Date: Aug. 10, 2018

(87) PCT Pub. No.: WO2017/183697
PCT Pub. Date: Oct. 26, 2017

(65) Prior Publication Data
US 2019/0051426 A1 Feb. 14, 2019

(30) Foreign Application Priority Data
Apr. 21, 2016 (JP) .............................. JP2016-085301

(51) Int. Cl.
*G21K 5/08* (2006.01)
*G21G 1/10* (2006.01)
(Continued)

(52) U.S. Cl.
CPC ............... *G21K 5/08* (2013.01); *B32B 9/007* (2013.01); *B32B 15/04* (2013.01); *C01B 32/205* (2017.08);
(Continued)

(58) Field of Classification Search
CPC .......... G21K 5/08; B32B 9/007; B32B 15/04; G21G 1/10; G21G 4/08; C01B 32/205;
(Continued)

(56) References Cited

U.S. PATENT DOCUMENTS

| 5,920,601 A | 7/1999 | Nigg et al. |
| 9,908,778 B2 * | 3/2018 | Buijsse .................. H01J 37/31 |

(Continued)

FOREIGN PATENT DOCUMENTS

| CN | 1826288 A | 8/2006 |
| CN | 103193221 A | 7/2013 |

(Continued)

OTHER PUBLICATIONS

Extended European Search Report issued in corresponding European Application No. 17786034.3; dated Apr. 4, 2019 (7 pages).
(Continued)

*Primary Examiner* — Darlene M Ritchie
(74) *Attorney, Agent, or Firm* — Osha Bergman Watanabe & Burton LLP

(57) ABSTRACT

Provided is a target plate for radioisotope production that has sufficient durability and sufficient heat resistance for use in radioisotope production and that is capable of reducing the extent of radioactivation. In a target plate for radioisotope production, a support substrate, which supports a target, includes a graphite film(s). The thermal conductivity in a surface direction of the graphite film(s) is 1200 W/(m·K) or greater, and the thickness of the graphite film(s) is 0.05 μm or greater and 100 μm or less.

8 Claims, 3 Drawing Sheets

(51) Int. Cl.
*G21G 4/08* (2006.01)
*C01B 32/205* (2017.01)
*C01B 32/21* (2017.01)
*B32B 9/00* (2006.01)
*B32B 15/04* (2006.01)
*H05H 6/00* (2006.01)

(52) U.S. Cl.
CPC .............. *C01B 32/21* (2017.08); *G21G 1/10* (2013.01); *G21G 4/08* (2013.01); *C01P 2006/10* (2013.01); *C01P 2006/32* (2013.01); *C01P 2006/40* (2013.01); *H05H 6/00* (2013.01)

(58) Field of Classification Search
CPC .. C01B 32/21; C01P 2006/10; C01P 2006/32; C01P 2006/40
See application file for complete search history.

(56) References Cited

U.S. PATENT DOCUMENTS

| | | | |
|---|---|---|---|
| 2006/0040064 | A1 | 2/2006 | Dombsky et al. |
| 2006/0104400 | A1 | 5/2006 | Lyoussi et al. |
| 2007/0032589 | A1 | 2/2007 | Nishikawa et al. |
| 2007/0297554 | A1* | 12/2007 | Lavie ................. G21G 1/10 376/190 |
| 2008/0286541 | A1 | 11/2008 | Zeisler et al. |
| 2009/0286057 | A1 | 11/2009 | Zeisler et al. |
| 2010/0196716 | A1 | 8/2010 | Ohta et al. |
| 2010/0266830 | A1 | 10/2010 | Nishikawa et al. |
| 2011/0165379 | A1 | 7/2011 | Ohta et al. |
| 2012/0034151 | A1 | 2/2012 | Nishikawa et al. |
| 2013/0064338 | A1 | 3/2013 | Matsumoto et al. |
| 2013/0101498 | A1 | 4/2013 | Nishikawa et al. |
| 2013/0121873 | A1 | 5/2013 | Kimura et al. |
| 2013/0170593 | A1 | 7/2013 | Jansen et al. |
| 2013/0189180 | A1 | 7/2013 | Ohta et al. |
| 2013/0213630 | A1 | 8/2013 | Southard, II |
| 2013/0279638 | A1 | 10/2013 | Matsumoto et al. |
| 2013/0280470 | A1 | 10/2013 | Norly |
| 2014/0029710 | A1 | 1/2014 | Wilson et al. |
| 2014/0056801 | A1 | 2/2014 | Nishikawa et al. |
| 2014/0091238 | A1 | 4/2014 | Miyashita et al. |
| 2015/0003576 | A1* | 1/2015 | Uhland .................. G21G 1/001 376/195 |
| 2015/0170780 | A1 | 6/2015 | Miyashita et al. |
| 2016/0249453 | A1 | 8/2016 | Tatami et al. |
| 2016/0324031 | A1 | 11/2016 | Fujiwara |
| 2017/0021387 | A1* | 1/2017 | Lin .......................... B32B 15/04 |
| 2017/0169908 | A1* | 6/2017 | Andrighetto ............ G21G 1/001 |

FOREIGN PATENT DOCUMENTS

| | | |
|---|---|---|
| CN | 103582721 A | 2/2014 |
| CN | 103582915 A | 2/2014 |
| EP | 1661856 A1 | 5/2006 |
| EP | 3285264 A1 | 2/2018 |
| EP | 3385956 A1 | 10/2018 |
| EP | 3447773 A1 | 2/2019 |
| JP | H04021508 A | 1/1992 |
| JP | H08222239 A | 8/1996 |
| JP | H09-142820 A | 6/1997 |
| JP | 2999381 B2 | 1/2000 |
| JP | 2004079304 A | 3/2004 |
| JP | 2004-535288 A | 11/2004 |
| JP | 2005326299 A | 11/2005 |
| JP | 2006196353 A | 7/2006 |
| JP | 2007101367 A | 4/2007 |
| JP | 2008-501612 A | 1/2008 |
| JP | 2009530493 A | 8/2009 |
| JP | 2011063509 A | 3/2011 |
| JP | 2012119062 A | 6/2012 |
| JP | 2012186012 A | 9/2012 |
| JP | 2012243640 A | 12/2012 |
| JP | 2012249940 A | 12/2012 |
| JP | 201354889 A | 3/2013 |
| JP | 2013054889 A | 3/2013 |
| JP | 2013-525744 A | 6/2013 |
| JP | 3185065 U | 8/2013 |
| JP | 3186199 U | 9/2013 |
| JP | 2013-216577 A | 10/2013 |
| JP | 2013206726 A | 10/2013 |
| JP | 2013-238515 A | 11/2013 |
| JP | 2014-517258 A | 7/2014 |
| WO | 2002-099816 A2 | 12/2002 |
| WO | 2015045641 A1 | 4/2015 |
| WO | WO-2015045641 A1 * | 4/2015 ............. C01B 32/20 |
| WO | 2015072428 A1 | 5/2015 |
| WO | 2015173098 A1 | 11/2015 |

OTHER PUBLICATIONS

International Search Report issued in International Application No. PCT/JP2017/015932, dated Jul. 18, 2017 (2 pages).
International Preliminary Report on Patentability issued in International Application No. PCT/JP2017/015932, dated Nov. 1, 2018 (9 pages).
Office Action issued in corresponding Japanese Application No. 2018-513215; dated Jun. 11, 2019 (13 pages).
International Search Report issued in International Application No. PCT/JP2017/015890, dated Jul. 18, 2017 (2 pages).
International Preliminary Report on Patentability issued in International Application No. PCT/JP2017/015890, dated Nov. 8, 2018 (6 pages).
"KANEKA Electrical and electronic materials—Typical properties—" 2010, (XP055577880) (1 page).
"KANEKA Electrical and electronic materials—Flexibility and electromagnetic sheilding effect—" 2010, (XP055577878) (1 page).
Y. Kaburagi et al.: "Thermal and electrical conductivity and magnetoresistance of graphite films prepared from aromatic polyimide films" Jan. 1, 2012, No. 253, pp. 106-115, (XP055576634) (10 pages).
Laird Heatspreader: High Thermal Conductive Graphite Sheet, Apr. 28, 2015 (XP055576976) (1 page).
High Thermal Conductive Graphite Sheet Preliminary (XP055576937) (2 pages).
Extended European Search Report issued in European Application No. 17789400.3, dated Apr. 18, 2019 (12 pages).
International Search Report issued in Intertnational Application No. PCT/JP2017/015906, dated Jul. 25, 2017 (2 pages).
International Preliminary Report on Patentability issued in Intertnational Application No. PCT/JP2017/015906, dated Nov. 1, 2018 (7 pages).
Keikikaku, ""PGS" Graphite Sheets," Nov. 7, 2015, XP055556674, retrieved from the Internet on Feb. 14, 2019: URL:https://eu.mouser.com/ds/2/315/AYA0000CE2-64434.pdf (10 pages).
Extended European Search Report issued in European Patent Application No. 17786030.1; dated Feb. 25, 2019 (8 pages).
Office Action issued in corresponding Japanese Patent Application No. 2018513212, dated Jul. 9, 2019 (10 pages).
Office Action issued in corresponding U.S. Appl. No. 16/080,642, dated Dec. 22, 2020 (28 pages).
Restriction Requirement issued in corresponding United States U.S. Appl. No. 16/092,986, dated Jun. 16, 2020 (9 pages).
Office Action issued in corresponding Chinese Patent Application No. 201780013388.0, dated Aug. 18, 2021, with translation (19 pages).
Office Action issued in corresponding Chinese Patent Application No. 201780014702.7, dated Aug. 24, 2021, with translation (13 pages).
Office Action issued in corresponding U.S. Appl. No. 16/080,642, dated May 5, 2021 (35 pages).

* cited by examiner

SUPPORT SUBSTRATE FOR RADIOISOTOPE PRODUCTION, TARGET PLATE FOR RADIOISOTOPE PRODUCTION, AND PRODUCTION METHOD FOR SUPPORT SUBSTRATE

TECHNICAL FIELD

The present invention relates to a support substrate for radioisotope production, a target plate for radioisotope production, and a method of producing a support substrate.

BACKGROUND ART

Radioisotopes (RI) are produced with the use of a neutron reactor or a particle accelerator. In a case where radioisotopes are produced with the use of a particle accelerator, if a target material is in solid form, the production of radioisotopes is normally carried out with the use of a target plate for radioisotope production, which includes a target for irradiation with a charged particle beam and a support substrate on which the target is disposed. Specifically, radioisotopes are produced in the following manner: the target on the support substrate is irradiated with charged particles such as protons with the use of a particle accelerator such as a cyclotron; and thereby nuclear reaction takes place. Examples of a material for the support substrate include graphite, titanium (Ti), aluminum (Al), and Havar foil. There is also a support substrate that includes a cooling mechanism for cooling the target heated by irradiation with the charged particle beam.

For example, Patent Literature 1 discloses a method of producing radionuclides in accordance with the Szilard-Chalmers principle. More specifically, Patent Literature 1 discloses a method of producing radionuclides, including: a step of irradiating a target medium containing a target nuclide material with neutrons to thereby produce radionuclides within the target nuclide material and then causing the radionuclides to be ejected from the target nuclide material; and a step of capturing and collecting the ejected radionuclides in a carbon-based recoil capture material that does not have an empty cage structure at crystallographic level. Patent Literature 1 discloses that examples of the carbon-based recoil capture material include isotropic amorphous carbon, graphite, and graphene.

Patent Literature 2 discloses a method for separating radioisotopes from a target after irradiation with a charged particle beam.

Patent Literature 3 discloses a technique to manufacture a radiation irradiation subject (target) for use in preparing radioisotopes.

Patent Literature 4 discloses a radioisotope producing apparatus for producing radioisotopes (RI) for use in positron emission tomography (PET).

Patent Literature 5 discloses a target plate for radioisotope production, which is constituted by a support substrate and a metal film for radioisotope production (this metal film is a target) that has been deposited on the support substrate by physical vapor deposition. Patent Literature 5 discloses that examples of a material for the support substrate include copper, silver, aluminum, carbon, and ceramics.

CITATION LIST

Patent Literature

Patent Literature 1

Published Japanese Translation of PCT International Application, Tokuhyo, No. 2013-525744

Patent Literature 2

Published Japanese Translation of PCT International Application, Tokuhyo, No. 2004-535288

Patent Literature 3

Published Japanese Translation of PCT International Application, Tokuhyo, No. 2008-501612

Patent Literature 4

Japanese Patent Application Publication, Tokukaihei, No. 2013-238515

Patent Literature 5

Specification of Japanese Patent No. 2999381

SUMMARY OF INVENTION

Technical Problem

However, the foregoing conventional target plates for radioisotope production, in which a target is disposed on a support substrate, have issues in that they have low durability and low heat resistance against charged particle beams.

A charged particle beam, after entering a target, loses all its energy while traveling a very short distance. This generates a large quantity of heat (several hundreds of $W/cm^2$) in the target. Therefore, a support substrate that supports the target is required to be durable and heat-resistant against charged particle beam irradiation. However, conventional materials for a support substrate are far from sufficient in terms of durability and heat resistance against high-energy charged particle beams.

Furthermore, especially in a case where the quantity of heat generated by irradiation with a high-energy charged particle beam is extremely large, usually a metal plate including a cooling mechanism (for example, a flow channel for passage of cooling water) is attached to the target plate for radioisotope production. The metal plate including a cooling mechanism is made of aluminum. The half-life of aluminum is 300,000 years, which means that aluminum becomes radioactive to an extremely large extent. Highly radioactive target plates for radioisotope production cannot be handled by humans. This leads to difficulty in irradiation with high-energy charged particle beams and continuous use of the beams.

The present invention was made in view of the above issues, and an object thereof is to obtain a support substrate for radioisotope production and a target plate for radioisotope production, each of which has sufficient durability and sufficient heat resistance against charged particle beam irradiation and is capable of reducing the extent of radioactivation, and a method of producing a support substrate.

Solution to Problem

A support substrate in accordance with one aspect of the present invention is a support substrate for radioisotope production, the support substrate being configured to support a target for receiving charged particle beam irradiation, the support substrate including one or more graphite films placed such that a surface thereof intersects a charged particle beam, the one or more graphite films each having a thermal conductivity, in a surface direction, of 1200 W/(m·K) or greater, the one or more graphite films each having a thickness of 0.05 µm or greater and 100 µm or less.

A target plate for radioisotope production in accordance with one aspect of the present invention includes: a target for receiving charged particle beam irradiation; and the foregoing support substrate supporting the target.

Advantageous Effects of Invention

One aspect of the present invention provides the following effects: sufficient durability and sufficient heat resistance are achieved and the extent of radioactivation can be reduced.

DESCRIPTION OF EMBODIMENTS

Figure 1:
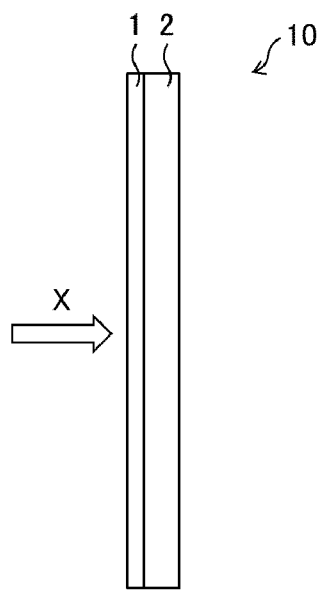
FIG. 1 is a cross-sectional view illustrating a configuration of a target plate for radioisotope production in accordance with Embodiment 1 of the present invention.

As described earlier, conventionally used materials for a support substrate for supporting a target are graphite, titanium (Ti), aluminum (Al), Havar foil, and the like. In particular, carbon materials such as graphite, which become radioactive only to a relatively small extent and which are resistant to heat (3000° C.) in vacuum, are ideal materials. However, conventional carbon films composed of graphite are prepared by vapor deposition, sputtering, or the like method. The inventors of the present application found on their own that the carbon films formed by such methods are far from sufficient in terms of durability and heat resistance against high-energy charged particle beams, and that these films cannot withstand high-energy charged particle beam irradiation in some cases. On the basis of this finding, the inventors worked hard in an attempt to develop a support substrate that can reduce the extent of radioactivation and that has sufficient durability and sufficient heat resistance against high-energy charged particle beam irradiation.

As a result, the inventors succeeded in developing a support substrate that can reduce the extent of radioactivation and that has sufficient durability and sufficient heat resistance against high-energy charged particle beam irradiation, by employing graphite having specific properties and certain dimensions. Specifically, the inventors made the following novel finding: it is possible to solve the foregoing issues by employing a graphite film whose thermal conductivity in a surface direction is equal to or greater than a certain value and whose thickness falls within a certain range. On the basis of this finding, the inventors accomplished the present invention.

Usually, when the thickness of a graphite film is reduced, the physical strength of the graphite film decreases. Therefore, reducing the thickness of a graphite film is in a trade-off relationship with improvements in durability and heat resistance against charged particle beam irradiation. Furthermore, since a large heat load is generated in the support substrate by irradiation of a target with a charged particle beam, it has been thought that a thin graphite film cannot withstand this heat load. In addition, it is very difficult to produce a thin graphite film that has a small thickness of, for example, 50 µm or less and that has excellent properties such as excellent thermal conductivity, excellent electric conductivity, and excellent flexibility (folding endurance).

The inventors, however, did several researches on their own and established a technique to produce a graphite film that is thin and that has excellent properties such as excellent thermal conductivity. The inventors did a further research and newly found that, surprisingly, this graphite film can reduce the extent of radioactivation and can also withstand the heat load generated by irradiation with a charged particle beam. The technical idea of the present invention based on the above finding reverses conventional findings, and is not the one that is predictable from conventional findings but the one that has been accomplished by the inventors themselves.

Embodiment 1

The following description will discuss one embodiment of the present invention. FIG. 1 is a cross-sectional view illustrating a configuration of a target plate for radioisotope production in accordance with Embodiment 1.

As illustrated in FIG. 1, a target plate for radioisotope production (hereinafter referred to as a target plate for short) 10 in accordance with Embodiment 1 includes a target 1 and a support substrate 2 supporting the target 1. The target plate 10 is a substrate for use in producing radioisotopes by receiving a charged particle beam X on a surface of the target 1. It should be noted that the radioisotope production using a target plate for radioisotope production in accordance with Embodiment 1 does not encompass production using a so-called neutron radiation method. Therefore, examples of the charged particle beam X with which the target 1 is irradiated exclude neutron beams.

(Target 1)

A material constituting the target 1 is selected from elements from which desired radioisotopes can be obtained by irradiation with the charged particle beam X. In a case where a charged particle is proton, the material is selected from a variety of target materials such as $^{235}U$, $^{68}Zn$, $^{203}Tl$, $^{201}Pb$, $^{79}Br$, $^{112}Cd$, $^{74}Se$, $^{50}Cr$, and $^{58}Fe$, and radioisotopes produced are a variety of radioisotopes such as $^{61}Cu$, $^{63}Cu$, $^{67}Ga$, $^{82}Sr/^{82m}Rb$, $^{89}Zr$, $^{124}I$, $^{67}Cu$, $^{125}I$, $^{211}At$, $^{225}Ac/^{213}Bi$, $^{99}Mo/^{99m}Tc$, $^{99m}Tc$, $^{123}I$, $^{111}In$, $^{201}Tl$, and/or $^{67}Ga$. These radioisotopes are widely used in diagnosing and/or treating diseases. For example, a nuclear reaction that produces $^{67}Ga$ is represented as $^{68}Zn(p, 2n)$, whereas a nuclear reaction that produces $^{201}Tl$ is represented as $^{203}Tl(p, 3n)^{201}Pb \rightarrow ^{201}Tl$.

A charged particle that can be used for a target plate for radioisotope production in accordance with Embodiment 1 is not limited to proton, and examples of the charged particle include various charged particles (deuterons) such as charged particles of Ca. Appropriate charged particle and target material are selected depending on a desired radioisotope. A reaction between such a charged particle and a target ranges widely. In that case, a material constituting the target 1 may be selected from lanthanoids and transition metals. For example, in a case where a desired radioisotope is $^{207}$At, $^{nat}$Hf is selected as a material constituting the target 1 and the target 1 is irradiated with a $^{48}$Ca$^{11+}$ beam serving as the charged particle beam X.

(Support Substrate 2)

The support substrate 2 is a graphite film placed such that a surface thereof intersects the charged particle beam X. It is only necessary that a graphite film constituting the support substrate 2 have a thermal conductivity, in a surface direction, of 1200 W/(m·K) or greater and have a thickness of 0.05 μm or greater and 100 μm or less. The other configurations of the graphite film are not particularly limited. Such a graphite film is preferred, because such a graphite film has sufficient durability and sufficient heat resistance against charged particle beam X irradiation and high thermal conductivity despite its small thickness of 0.05 μm or greater and 100 μm or less. The term "thickness" as used herein means a dimension of the support substrate 2 along the direction in which the charged particle beam X passes through the support substrate 2.

Since the support substrate 2 is a thin graphite film having a small thickness of 0.05 μm or greater and 100 μm or less as described above and has a small heat capacity, energy loss is reduced and production efficiency of radioisotopes is improved.

Furthermore, the use of a target plate 10 that is sufficiently durable and sufficiently heat-resistant against charged particle beam X irradiation makes it possible to use a charged particle beam X having an increased intensity and thus possible to mass-produce radioisotopes.

Furthermore, in preparing a radioisotope with short half-life such as RI for PET, it is necessary to quickly separate the radioisotope from the target plate 10. In a case where the support substrate 2 and a member near the support substrate 2 have become radioactive, a worker is at a risk of exposure to radiation when the worker removes the target plate 10 from a radioisotope producing apparatus including an accelerator. Furthermore, in a case where these members become radioactive, disposal of these members as radioactive waste, for example, will be a problem. Under such circumstances, there have been no suitable methods in conventional techniques to separate radioisotopes from the target plate 10 after the nuclear reaction.

According to Embodiment 1, the extent of radioactivation is reduced, and also sufficient durability and sufficient heat resistance against high-energy charged particle beam irradiation are achieved and high thermal conductivity is achieved. It is therefore easy to remove the target plate 10 from a radioisotope producing apparatus including an accelerator. Thus, according to Embodiment 1, it is possible to easily separate radioisotopes from the target plate 10 after nuclear reaction.

(Method of Producing Graphite Film)

A method of producing a graphite film in accordance with Embodiment 1 is not particularly limited, and is, for example, a method of preparing a graphite film by treating a polymeric film with heat (e.g., by firing a polymeric film). Specifically, a method of producing a graphite film of one example of Embodiment 1 includes: a carbonizing step including carbonizing an aromatic polyimide film; and a graphitizing step including graphitizing the carbonized aromatic polyimide film.

<Carbonizing Step>

The carbonizing step involves carrying out carbonization by preheating an aromatic polyimide film, which is a starting material, under reduced pressure or in nitrogen gas. The heat treatment temperature for carbonization is preferably at least 500° C., more preferably 600° C. or above, most preferably 700° C. or above. During the carbonization, a pressure may be applied to the film along the thickness direction of the film and/or a tensile force may be applied to the film along a direction parallel to the surface of the film to the extent that the film is not damaged, in order to prevent wrinkles from forming in the starting polymeric film.

<Graphitizing Step>

In the graphitizing step, graphitization may be carried out after removing the carbonized polyimide film from a furnace and then transferring it to a graphitization furnace, or carbonization and graphitization may be carried out continuously. The graphitization is carried out under reduced pressure or in an inert gas. Suitable inert gases are argon and helium. The treatment may be carried out until the heat treatment temperature (firing temperature) reaches 2400° C. or above, preferably 2600° C. or above, more preferably 2800° C. or above. In the graphitizing step, a pressure may be applied along the thickness direction of the film, and/or a tensile force may be applied to the film along a direction parallel to the surface of the film.

According to the above method, it is possible to obtain a graphite film that has a good graphite crystal structure and that is highly thermally conductive.

The polymeric film for use in Embodiment 1 is preferably a heat-resistant aromatic polymer, which is, for example, a polymeric film of at least one polymer selected from aromatic polyamides, aromatic polyimides, polyquinoxaline, polyparaphenylene vinylene, polyoxadiazole, polybenzimidazole, polybenzoxazole, polybenzthiazole, polyquinazolinedione, polybenzoxazinone, polyquinazolone, benzimidazobenzophenanthroline ladder polymer, polybenzobisthiazole, polybenzobisoxasole, polybenzobisimidazole, polythiazole, and derivatives of those listed above. A particularly preferable raw material film for the graphite film of Embodiment 1 is an aromatic polyimide film.

(Thermal Conductivity in Surface Direction of Graphite Film)

The thermal conductivity in a surface direction of a graphite film in Embodiment 1 is 1200 W/(m·K) or greater, preferably 1400 W/(m·K) or greater, more preferably 1600 W/(m·K) or greater, even more preferably 1800 W/(m·K) or greater.

From graphite films each having a thermal conductivity in the surface direction of 1200 W/(m·K) or greater, it is possible to obtain multilayer graphite having a better heat dissipation performance. A graphite film having a thermal conductivity in the surface direction of 1200 W/(m·K) or grater means that the thermal conductivity of this graphite film is equal to or greater than 3 times that of a metal material (for example, copper, aluminum).

Furthermore, the graphite film preferably has anisotropy (orientation) such that the thermal conductivity in the surface direction of the graphite film is equal to or greater than 50 times, more preferably equal to or greater than 100 times, the thermal conductivity in the thickness direction of the graphite film.

The thermal conductivity in the surface direction of a graphite film is calculated using the following equation (1):

$$A = \alpha \times d \times Cp \quad (1)$$

where A represents the thermal conductivity in the surface direction of the graphite film, α represents the thermal diffusivity in the surface direction of the graphite film, d represents the density of the graphite film, and Cp represents the specific heat capacity of the graphite film. The density, the thermal diffusivity, and the specific heat capacity in the surface direction of the graphite film are obtained in the following manner.

The density of a graphite film is measured in the following manner: a sample measuring 100 mm×100 mm cut from the graphite film is measured for weight and thickness; and the measured value of the weight is divided by the value of volume (calculated from 100 mm×100 mm×thickness).

The specific heat capacity of a graphite film is measured with the use of a differential scanning calorimeter DSC220CU, which is a thermal analysis system manufactured by SII NanoTechnology Inc., in the condition in which temperature is raised from 20° C. to 260° C. at 10° C./min.

The thermal conductivity in the thickness direction of the graphite film can be calculated in the same manner as described above using the foregoing equation (1), except that α in the equation is the thermal diffusivity in the thickness direction of the graphite film.

In a case where the thickness of the graphite film is greater than 3 μm, the thermal diffusivity in the surface direction of the graphite film can be measured with the use of a commercially-available thermal diffusivity measuring instrument using a light alternating-current method (for example, "LaserPIT" available from ULVAC RIKO, Inc.) in the following manner, for example: a sample measuring 4 mm×mm cut from the graphite film is measured in an atmosphere of 20° C. at a laser frequency of 10 Hz. On the other hand, in a case where the thickness of the graphite film is equal to or less than 3 μm, the thermal diffusivity in the surface direction of the graphite film is difficult to accurately measure with the use of a commercially-available instrument, and thus is measured by a newly developed periodical heating method.

The thermal diffusivity in the thickness direction of the graphite film is determined by a pulse heating method using a laser. In this method, a laser is shined on one surface of the film and thereby the film is heated, and thereafter a temperature response (temperature change) at the opposite surface of the film is measured. Then, half-time ($t_{1/2}$) of time (t) taken for the temperature to reach a certain temperature is calculated using the following equation (2):

$$\alpha = \frac{d^2}{\tau_0} = 0.1388 \times \frac{d^2}{t_{1/2}} \quad (2)$$

where α represents thermal diffusivity, $\tau_0$ represents the period of thermal diffusion, d represents the thickness of a sample, $t_{1/2}$ represents half-time, and 0.1388 is the apparatus constant of the apparatus used.

(Thickness of Graphite Film)

The thickness of a graphite film in Embodiment 1 is 0.05 μm or greater and 100 μm or less, more preferably 0.1 μm or greater and 50 μm or less, particularly preferably 0.5 μm or greater and 25 μm or less. The graphite film having such a thickness is preferred, because, even upon beam irradiation, the support substrate 2 is less likely to become radioactive.

The thickness of a graphite film is measured in the following manner: thicknesses at any ten locations of a sample measuring 50 mm×50 mm cut from the graphite film are measured in a thermostatic chamber at 25° C. with the use of a thickness gage (HEIDENHAIN-CERTO, manufactured by HEIDENHAIN); and the mean of the thicknesses is used as the thickness of the graphite film.

(Electric Conductivity in Surface Direction of Graphite Film)

The electric conductivity in the surface direction of a graphite film in Embodiment 1 is not particularly limited, and is preferably 12000 S/cm or greater, preferably 14000 S/cm or greater, more preferably 16000 S/cm or greater, more preferably 18000 S/cm or greater, most preferably 20000 S/cm or greater.

Furthermore, the graphite film preferably has anisotropy (orientation) such that the electric conductivity in the surface direction of the graphite film is equal to or greater than 100 times the electric conductivity in the thickness direction of the graphite film.

The electrical conductivity of a graphite film is measured by applying a constant current in a four-point probe method (for example, by using Loresta-GP, manufactured by Mitsubishi Chemical Analytech Co., Ltd.)

(Density of Graphite Film)

The density of a graphite film in Embodiment 1 is not particularly limited, and is preferably 1.40 g/cm$^3$ or greater, preferably 1.60 g/cm$^3$ or greater, more preferably 1.80 g/cm$^3$ or greater, more preferably 2.00 g/cm$^3$ or greater, more preferably 2.10 g/cm$^3$ or greater. A graphite film having a density of 1.40 g/cm$^3$ or greater is preferred, because such a graphite film has an excellent self-supporting property and excellent mechanical strength properties.

Furthermore, since a graphite film having a greater density has a higher possibility of interacting with a charged particle beam, a graphite film having a high density is highly effective as an energy degrader. In addition, a graphite film having a high density has little gap between its constituent graphite layers, and therefore such a graphite film tends to have a high thermal conductivity. In a case where a graphite film has a low density, such a graphite film has a poor efficiency in decelerating a charged particle beam, and, in addition, the graphite film also has a decreased thermal conductivity due to the effects of air layers between the constituent graphite layers. This is therefore not preferred. It is also inferred that, in the air layers (hollow portions), thermal conductivity is poor and thus heat is likely to be trapped in these portions, or that the air layers in the hollow portions expand due to temperature increase caused by heat. Therefore, a graphite film having a low density easily deteriorates and/or is damaged. Furthermore, in a case where a graphite film has a high density, a charged particle beam is less likely to be scattered when passing through the graphite film. Therefore, in the case of a graphite film having a high density, a charged particle beam is less likely to be scattered even in a case where such graphite films are stacked together. In view of these matters, the graphite film preferably has a high density. Specifically, the density is preferably 1.40 g/cm$^3$ or greater, preferably 1.60 g/cm$^3$ or greater, more preferably 1.80 g/cm$^3$ or greater, more preferably 2.00 g/cm$^3$ or greater, more preferably 2.10 g/cm$^3$ or greater. In regard to the upper limit of the density of the graphite film, the density of the graphite film is 2.26 g/cm$^3$ (theoretical value) or less, and may be 2.24 g/cm$^3$ or less.

The density of a graphite film is measured in the following manner: a sample measuring 100 mm×100 mm cut from the graphite film is measured for weight and thickness; and the measured value of the weight is divided by the value of volume (calculated from 100 mm×100 mm×thickness).

(MIT Folding Endurance of Graphite Film)

The number of times a graphite film is folded in an MIT folding endurance test for the graphite film may be preferably 500 or more, more preferably 1000 or more, even more preferably 5000 or more, particularly preferably 10000 or more.

The MIT folding endurance test for a graphite film is carried out in the following manner. Three test pieces each measuring 1.5×10 cm are removed from the graphite film. The test is carried out with the use of an MIT crease-flex fatigue resistance tester Model D manufactured by Toyo Seiki Seisaku-sho, Ltd. under the conditions in which test load is 100 gf (0.98 N), speed is 90 times/min., and radius of curvature R of folding clamp is 2 mm. The graphite film is folded to an angle of 135° in either direction in an atmosphere of 23° C., and the number of times the graphite film is folded before the graphite film is severed is counted.

(Energy of Charged Particle Beam B in Embodiment 1)

In the target plate 10, a charged particle beam X passes through the support substrate 2 constituted by a graphite film. The energy of the charged particle beam passing through the support substrate 2 is relatively low. The collision stopping power (energy loss) of a target substance (in this case, the support substrate 2) for a charged particle is represented by the following Bethe equation (equation (3)):

$$S_{col} = -\frac{4\pi e^4 z^2 N}{mv^2} Z \left[ \ln \frac{2mv^2}{I(1-\beta^2)} - \beta^2 \right] \quad (3)$$

where e represents elementary charge of electron, represents mass of electron, v represents velocity of electron, z represents nuclear charge of incident particle, Z represents the atomic number of the target substance, N represents the number of atoms per unit volume of the target substance, I represents the mean excitation potential of the target material, and β represents v/c where c is the speed of light.

Figure 2:
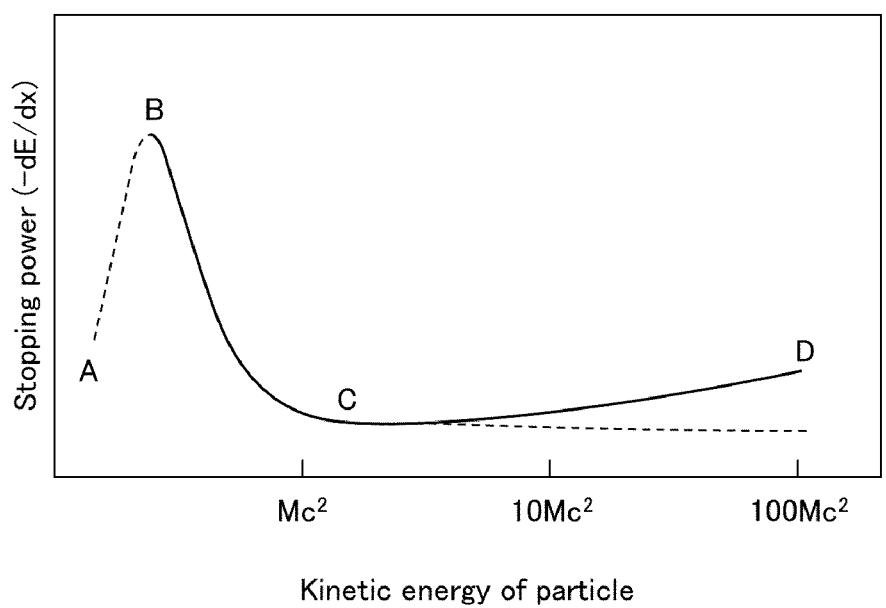
FIG. 2 is a graph showing the relationship between stopping power based on the Bethe equation and kinetic energy of particle.
Figure 3:
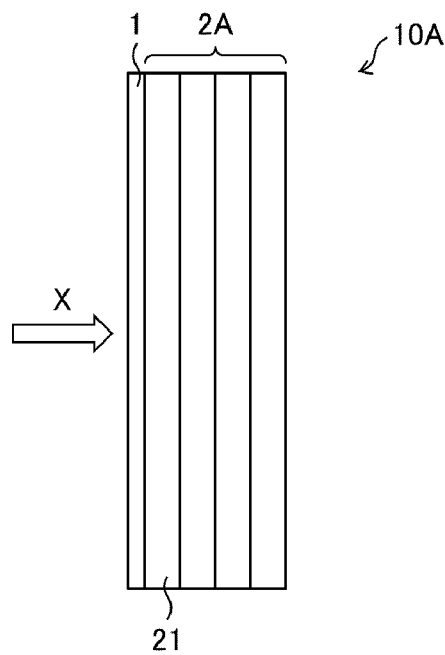
FIG. 3 is a cross-sectional view illustrating a configuration of a target plate for radioisotope production in accordance with Embodiment 2 of the present invention.

FIG. 2 is a graph showing the relationship between the stopping power based on the Bethe equation (equation (3)) and kinetic energy of particle. As illustrated in FIG. 3, the collision stopping power (energy loss) of a target substance for a charged particle increases from A (kinetic energy of particle is low) to B and reaches maximum at B. Then, the stopping power decreases from B to C in proportion to $1/v^2$, and reaches minimum at C. Then, the stopping power gradually increases from C to D, where logarithms of the Bethe equation (equation (3)) are effective.

The charged particle beam X, which is to be received by the target plate 10 in accordance with Embodiment 1, is a charged particle beam whose energy falls within the energy range of B to C, and thus has a relatively low energy. The energy of the charged particle beam X at B is on the order of MeV (for example, 1 MeV), and the energy of the charged particle beam X at C is on the order of GeV (for example, 3 GeV). The stopping power of the target substance at B is about 100 times as high as the stopping power of the target substance at C.

Therefore, the target plate 10 in accordance with Embodiment 1 is required to be about 100 times as durable as an attenuation member for use for an accelerator which accelerates a charged particle beam whose energy falls within the energy range of C to D (for example, energy of 3 GeV or greater), provided that the number of charged particles is the same. The number of charged particles differs depending on the intended use of each accelerator, and therefore the target plate 10 is not always required to be 100 times as durable. However, in the energy range of 1 to 100 MeV required in the major application of the target plate 10 in accordance with Embodiment 1, the target plate 10 is undoubtedly required to be far more durable than that for use for a high-energy accelerator for 3 GeV or greater.

Under such severe conditions, the graphite film of the target plate 10 in accordance with Embodiment 1 can satisfy the above required durability despite the foregoing thickness.

In the energy range of from 1 to 100 MeV, the target plate 10 in accordance with Embodiment 1 is sufficiently durable and sufficiently heat-resistant especially against both of (i) charged particle beams B in the energy range of from 18 to 30 MeV which is suitable for production of radiopharmaceuticals and (ii) charged particle beams B in the energy range of 10 MeV and below which is suitable for production of RI for PET.

(Method of Producing Target Plate 10)

A method of forming a target 1 on a support substrate 2 constituted by a graphite film is not particularly limited, and may be appropriately selected according to the characteristics of the target 1. The target 1 may be formed on the support substrate 2 by, for example, physical vapor deposition. The physical vapor deposition is a technique to form the target 1 in the form of a thin film on the support substrate 2 by: breaking up a solid material containing constituent atoms of the target 1 into the form of atoms, molecules, or clusters through a physical action; and supplying the atoms, molecules, or clusters to a space in which the support substrate 2 is present. The physical vapor deposition that can be used in Embodiment 1 may be any known method. Examples of the physical vapor deposition include vacuum deposition, ion plating, ionized cluster beam deposition, sputter deposition, ionized cluster deposition, and magnetron sputtering.

Embodiment 2

The following description will discusses another embodiment of the present invention with reference to FIG. 3. For convenience, members having functions identical to those described in Embodiment 1 are assigned identical referential numerals and their descriptions are omitted here.

FIG. 3 is a cross-sectional view illustrating a configuration of a target plate 10A in accordance with Embodiment 2. As illustrated in FIG. 3, the target plate 10A in accordance with Embodiment 2 is different from that of Embodiment 1 in that the target plate 10A includes a support substrate 2A which is a stack of graphite films 21. In a case where the quantity of heat generated by irradiation with the charged particle beam X is extremely large, the support substrate 2A may be constituted by a stack of graphite films 21, as described in Embodiment 2.

The thickness of each of the graphite films 21 is 0.05 μm or greater and 100 μm or less. The support substrate 2A can be prepared by pressure-laminating two or more graphite films 21 together. Since the support substrate 2A is constituted by a stack of graphite films 21 in this manner, the support substrate 2A has improved durability and improved heat resistance against charged particle beam X irradiation.

The thickness of the support substrate 2A constituted by a stack of graphite films 21 is 1 μm or greater and 1 mm or less, more preferably 10 μm or greater and 500 μm or less, particularly preferably 30 μm or greater and 300 μm or less.

Embodiment 3

Figure 4:
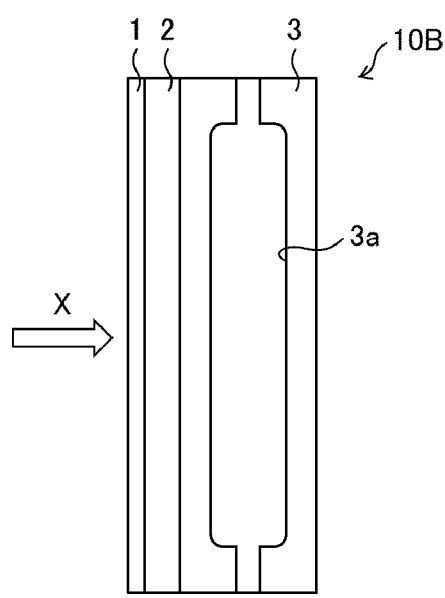
FIG. 4 is a cross-sectional view illustrating a configuration of a target plate for radioisotope production in accordance with Embodiment 3 of the present invention.

The following description will discusses still another embodiment of the present invention with reference to FIG. 4. For convenience, members having functions identical to those described in the foregoing embodiments are assigned identical referential numerals and their descriptions are omitted here.

FIG. 4 is a cross-sectional view illustrating a configuration of a target plate 10B in accordance with Embodiment 3. The target plate 10B in accordance with Embodiment 3 is different from that of Embodiment 1 in that a metal plate 3 is disposed on the opposite side of the support substrate 2 from the target 1. In a case where the quantity of heat generated by irradiation with the charged particle beam X is extremely large, the metal plate 3 may be provided to cool the target 1 and the support substrate 2, as described in Embodiment 3.

A material constituting the metal plate 3 is a metal with a high thermal conductivity, such as aluminum. Since the metal plate 3 is provided in this manner, heat in the target 1 is equalized and nuclear reaction efficiency improves.

Furthermore, the support substrate 2 constituted by a graphite film makes it possible to prevent the metal plate 3 from becoming radioactive. Therefore, a worker can detach the target 1 and the support substrate 2 from the metal plate 3 after the nuclear reaction in the target 1 has finished and can quickly carry out the separation of RI. Thus, the efficiency of the separation of RI improves.

The metal plate 3 may have therein a coolant flow channel 3a serving as a cooling mechanism, as illustrated in FIG. 4. A coolant for passage through the coolant flow channel 3a is a liquid with a high thermal conductivity, such as cooling water.

In a case where the metal plate 3 does not have the cooling mechanism, the total thickness of the target 1, the support substrate 2, and the metal plate 3 is 10 μm or greater and 10 mm or less, more preferably 100 μm or greater and 7 mm or less, particularly preferably 200 μm or greater and 5 mm or less.

In a case where the metal plate 3 has the cooling mechanism, the total thickness of the target 1, the support substrate 2, and the metal plate 3 is 1 mm or greater and 5 cm or less, more preferably 2 mm or greater and 4 cm or less, and particularly preferably 5 mm or greater and 3 cm or less.

Embodiment 4

Figure 5:
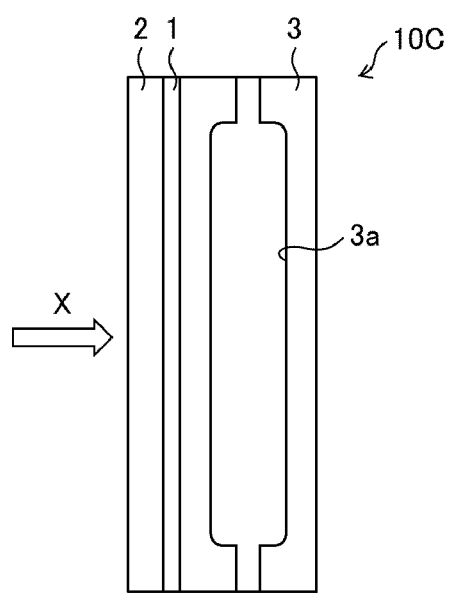
FIG. 5 is a cross-sectional view illustrating a configuration of a target plate for radioisotope production in accordance with Embodiment 4 of the present invention.

The following description will discusses still another embodiment of the present invention with reference to FIG. 5. For convenience, members having functions identical to those described in the foregoing embodiments are assigned identical referential numerals and their descriptions are omitted here.

FIG. 5 is a cross-sectional view illustrating a configuration of a target plate 10C in accordance with Embodiment 4. The target plate 10C in accordance with Embodiment 4 is different from those of Embodiments 1 and 3 in that the support substrate 2 and the target 1 are arranged such that the charged particle beam X is first incident on the support substrate 2. That is, the relative positions of the target 1 and the support substrate 2 of the target plate 10C in accordance with Embodiment 4 are inverted as compared to the target 1 and the support substrate 2 of the target plate 10 in accordance with Embodiment 1.

In other words, the target plate 10B in accordance with Embodiment 3 is structured such that the metal plate 3 is directly disposed on the support substrate 2, whereas the target plate 10C in accordance with Embodiment 4 is different from that of Embodiment 3 in that the metal plate 3 is disposed indirectly on the support substrate 2 with the target 1 therebetween.

In a case where the thickness of the support substrate 2 constituted by a graphite film is extremely small, the charged particle beam X passes through the support substrate 2 and undergoes nuclear reaction in the target 1 and thereby radioisotopes are generated. Since the charged particle beam X passes through the support substrate 2 and reaches the target 1 also in the target plate 10C in accordance with Embodiment 4 in this manner, the target plate 10C in accordance with Embodiment 4 provides similar effects to those of Embodiment 1.

The thickness of the support substrate 2 of the target plate 10C may be any thickness, provided that the thickness allows penetration of the charged particle beam X. The thickness of the support substrate 2 is preferably 0.001 μm or greater and 10 μm or less, more preferably 0.05 μm or greater and 5 μm or less, particularly preferably 0.1 μm or greater and 2 μm or less.

A target plate in accordance with the present invention is not limited to the configurations of the foregoing Embodiments 1 to 3, and may be configured such that, for example, a target is sandwiched between two support substrates composed of graphite.

Furthermore, although a target is a solid material disposed on a support substrate according to the foregoing Embodiments 1 to 3, the target may alternatively be, for example, a liquid such as target solution. In such a case in which the target is a liquid, a support substrate may be in the form of, for example, a box for housing the target in liquid form, because the support substrate constituted by a graphite film has flexibility.

The present invention is not limited to the embodiments, but can be altered by a skilled person in the art within the scope of the claims. The present invention also encompasses, in its technical scope, any embodiment derived by combining technical means disclosed in differing embodiments.

[Recap]

A support substrate in accordance with one aspect of the present invention is a support substrate for radioisotope production, the support substrate being configured to support a target for receiving charged particle beam irradiation, the support substrate including one or more graphite films placed such that a surface thereof intersects a charged particle beam, the one or more graphite films each having a thermal conductivity, in a surface direction, of 1200 W/(m·K) or greater, the one or more graphite films each having a thickness of 0.05 μm or greater and 100 μm or less.

According to the above arrangement, the support substrate includes one or more graphite films placed such that a surface thereof intersects a charged particle beam, the one or more graphite films each having a thermal conductivity, in a surface direction, of 1200 W/(m·K) or greater, the one or more graphite films each having a thickness of 0.05 μm or greater and 100 μm or less. It is therefore possible to obtain a support substrate for radioisotope production that has sufficient durability and sufficient heat resistance against charged particle beam irradiation and that is capable of reducing the extent of radioactivation.

The support substrate in accordance with one embodiment of the present invention is preferably arranged such that, in the one or more graphite films, the thermal conductivity in the surface direction is equal to or greater than 50 times a thermal conductivity in a thickness direction. As such, the graphite film(s) constituting the support substrate in accordance with one aspect of the present invention has a high orientation and a high anisotropy in thermophysical property.

The support substrate in accordance with one aspect of the present invention is preferably arranged such that, in the one or more graphite films, an electric conductivity in the surface direction is 12000 S/cm or greater.

The support substrate in accordance with one aspect of the present invention is preferably arranged such that, in the one or more graphite films, an electric conductivity in the surface direction is equal to or greater than 100 times an electric conductivity in a thickness direction.

The support substrate in accordance with one aspect of the present invention may be arranged such that: the one or more graphite films are two or more graphite films; the support substrate includes a stack of the two or more graphite films; and the support substrate has a total thickness of 0.1 µm or greater and 1 mm or less. This improves durability and heat resistance against charged particle beam irradiation.

The support substrate in accordance with one aspect of the present invention is preferably arranged such that the one or more graphite films each have a density of 1.40 g/cm$^3$ or greater and 2.26 g/cm$^3$ or less.

The support substrate in accordance with one aspect of the present invention may include a metal plate made of a metal, the metal plate being disposed on the one or more graphite films. The expression "a metal plate made of a metal, the metal plate being disposed on the one or more graphite films" herein means a metal plate directly disposed on the one or more graphite films or a metal plate indirectly disposed on the one or more graphite films with some layer(s) therebetween.

The support substrate in accordance with one aspect of the present invention is preferably arranged such that the metal plate includes a cooling mechanism. This equalizes heat generated in the target and nuclear reaction efficiency improves.

A target plate for radioisotope production in accordance with one aspect of the present invention includes: a target for receiving charged particle beam irradiation; and the foregoing support substrate supporting the target.

According to the above arrangement, it is possible to obtain a target plate for radioisotope production that has sufficient durability and sufficient heat resistance against charged particle beam irradiation and that is capable of reducing the extent of radioactivation.

A method of producing a support substrate in accordance with one aspect of the present invention is a method of producing a support substrate for radioisotope production, the support substrate being configured to support a target for receiving charged particle beam irradiation, the method including a step of preparing a graphite film by firing a polymeric film, the graphite film constituting at least part of the support substrate.

According to the above arrangement, it is possible to provide a method of producing a support substrate for radioisotope production that has sufficient durability and sufficient heat resistance against charged particle beam irradiation and that is capable of reducing the extent of radioactivation.

The method in accordance with one aspect of the present invention is preferably arranged such that the polymeric film is made of a heat-resistant aromatic polymer.

The method in accordance with one embodiment of the present invention is particularly preferably arranged such that the heat-resistant aromatic polymer is an aromatic polyimide.

The method in accordance with one aspect of the present invention is preferably arranged such that the step of preparing includes firing the polymeric film in an inert gas at a temperature equal to or above 2400° C. to graphitize the polymeric film.

EXAMPLES

The following description will describe embodiments of the present invention in more detail on the basis of Examples. It should be understood that the present invention is not limited to Examples shown below and that details can be altered in various manners.

(Preparation of Support Substrate for Radioisotope Production)

A support substrate constituted by a graphite film was prepared by a polymer firing method.

First, a polymeric film composed of an aromatic polyimide was obtained using, as raw materials, pyromellitic dianhydride (PMDA) as a dianhydride and a mixture of 4,4'-diaminodiphenyl ether (ODA) and p-phenylenediamine (PDA) as a diamine. The polymeric film was fired in an inert gas at 3000° C. and thereby the aromatic polyimide was graphitized. In this way, a graphite film having a thickness of 1.6 µm was obtained.

The obtained graphite film had a thermal conductivity in the surface direction of 1900 W/(m·K) and a thermal conductivity in the thickness direction of 8 W/(m·K).

The obtained graphite film had an electric conductivity in the surface direction of 24000 S/cm and an electric conductivity in the thickness direction of 10 S/cm.

(Preparation of Target Plate for Radioisotope Production, and Production of RI)

Example 1

A graphite film having a thickness of 1.6 µm, which serves as a support substrate for supporting a target, was cut into a certain size, and then was set within a dedicated frame. Then, the frame holding the graphite film was attached to a 30 Mev cyclotron apparatus (ACSI TR-30). Then, a $^{68}$Zn film as a target material was formed on the graphite film by vacuum sputtering within a magnetron sputtering apparatus.

Comparative Example 1

A titanium film having a thickness of 2 µm, which serves as a support substrate for supporting a target, was cut into a certain size, and then was set within a dedicated frame. Then, the frame holding the titanium film was attached to a 30 Mev cyclotron apparatus (ACSI TR-30). Then, a $^{68}$Zn film as a target was formed on the titanium film by vacuum sputtering within a magnetron sputtering apparatus.

The target plates for radioisotope production of Example 1 and Comparative Example 1 were each irradiated with a proton beam with the use of the foregoing cyclotron apparatus and spectra were measured, and thereby the generation of the radioisotope $^{67}$Ga was confirmed. Furthermore, changes in temperature of each target plate during beam irradiation were measured with the use of a radiation thermometer (manufactured by Hazama Sokki Co., Ltd.). As a result of determining the temperature response characteristics in the case of beam irradiation on the target plates for radioisotope production of Comparative Example 1 and Example 1, it was found that, in the target plate for radioisotope production of Comparative Example 1, the temperature continues to rise as beam irradiation continues, and that, in the target plate for radioisotope production of Example 1, the temperature does not rise even when beam irradiation continues. In regard to the time from when the beam irradiation starts to when the target plate for radioisotope production reaches temperature equilibrium, the time for the target plate for radioisotope production of Example 1 was about one-half of the time for the target plate for radioisotope production of Comparative Example 1. In regard to the time from when the beam irradiation stops to when the target plate for radioisotope production reaches temperature equilibrium, the time for the target plate for radioisotope production of Example 1 was one-third of the time for the target plate for radioisotope production of Comparative Example 1.

These results showed that the graphite film used in Example 1 can be used for RI production without problems. It was also found that the graphite film used in Example 1 is more durable than a titanium film used as a conventional substrate for radioisotope production, allows continuous use of beam irradiation, and can withstand higher-intensity beams than the titanium film.

INDUSTRIAL APPLICABILITY

The present invention can be used in radioisotope production.

REFERENCE SIGNS LIST

1 Target
2, 2A, 2B, 2C Support substrate (support substrate for radioisotope production)
3 Metal plate
3a Coolant flow channel (cooling mechanism)
10, 10A, 10B, 10C Target plate (target plate for radioisotope production)

The invention claimed is:

1. A support substrate for radioisotope production, the support substrate being configured to support a target for receiving charged particle beam irradiation, the support substrate consisting essentially of two or more graphite films, wherein:
the two or more graphite films are placed such that a surface thereof intersects a charged particle beam,
the two or more graphite films each have a thermal conductivity, in a surface direction, of 1200 W/(m·K) or greater,
the two or more graphite films each have a thickness of 0.05 μm or greater and less than 100 μm,
the support substrate includes a stack of the two or more graphite films; and the support substrate has a total thickness of 0.1 μm or greater and 1 mm or less.

2. The support substrate according to claim 1, wherein, in the two or more graphite films, the thermal conductivity in the surface direction is equal to or greater than 50 times a thermal conductivity in a thickness direction.

3. The support substrate according to claim 1, wherein, in the two or more graphite films, an electric conductivity in the surface direction is 12000 S/cm or greater.

4. The support substrate according to claim 1, wherein, in the two or more graphite films, an electric conductivity in the surface direction is equal to or greater than 100 times an electric conductivity in a thickness direction.

5. The support substrate according to claim 1, wherein the two or more graphite films each have a density of 1.40 g/cm$^3$ or greater and 2.26 g/cm$^3$ or less.

6. The support substrate according to claim 1, comprising a metal plate made of a metal, the metal plate being disposed on the two or more graphite films.

7. The support substrate according to claim 6, wherein the metal plate includes a cooling mechanism.

8. A target plate for radioisotope production, comprising:
a target for receiving charged particle beam irradiation; and
the support substrate recited in claim 1, the support substrate supporting the target.

* * * * *